(12) United States Patent
Dehlink et al.

(10) Patent No.: US 8,620,248 B2
(45) Date of Patent: Dec. 31, 2013

(54) MULTICHANNEL RECEIVER SYSTEM AND METHOD FOR MULTICHANNEL RECEIVER MONITORING

(75) Inventors: Bernhard Dehlink, Unterhaching (DE); Ralf Reuter, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 158 days.

(21) Appl. No.: 13/322,942

(22) PCT Filed: Jun. 29, 2009

(86) PCT No.: PCT/IB2009/052803
§ 371 (c)(1),
(2), (4) Date: Nov. 29, 2011

(87) PCT Pub. No.: WO2011/001206
PCT Pub. Date: Jan. 6, 2011

(65) Prior Publication Data
US 2012/0088464 A1    Apr. 12, 2012

(51) Int. Cl.
*H04B 1/06* (2006.01)
*H04B 1/16* (2006.01)

(52) U.S. Cl.
USPC .......... 455/255; 455/272; 455/334; 375/322; 342/174

(58) Field of Classification Search
USPC .............. 455/255, 269, 272, 276.1, 280, 334; 375/322, 329; 342/165, 173, 174
See application file for complete search history.

(56) References Cited

U.S. PATENT DOCUMENTS

| | | | |
|---|---|---|---|
| 3,471,855 A | 10/1969 | Thompson | |
| 3,883,870 A | 5/1975 | Kunz | |
| 4,201,986 A * | 5/1980 | Ducrocq | 342/100 |
| 4,394,659 A | 7/1983 | Gellekink | |
| 4,719,465 A * | 1/1988 | Kuroda | 342/151 |
| 4,984,293 A | 1/1991 | Cummings et al. | |
| 5,237,332 A | 8/1993 | Estrick et al. | |
| 5,867,123 A | 2/1999 | Geyh et al. | |
| 2003/0160719 A1 | 8/2003 | Hancock | |
| 2007/0060080 A1 | 3/2007 | Nishimura et al. | |
| 2008/0096509 A1 | 4/2008 | Ling | |

FOREIGN PATENT DOCUMENTS

JP    2005-159587 A    11/2003
WO    99/52173 A2    10/1999

OTHER PUBLICATIONS

International Search Report and Written Opinion correlating to PCT/IB2009/052803 dated Mar. 9, 2010.

* cited by examiner

*Primary Examiner* — Quochien B Vuong

(57) ABSTRACT

A multichannel receiver system comprises a first plurality of receiver circuits, each having a first input connected to a corresponding one of a second plurality of input lines, each being arranged to provide a corresponding one of a third plurality of received signals; a second input connected to a local oscillator arranged to provide a local oscillator signal; and an output arranged to provide a corresponding one of a fourth plurality of output signals; and an upconversion mixer having a first mixer input for receiving a reference signal; a second mixer input connected to the local oscillator; and a mixer output providing an upconverted reference signal to a fifth plurality of directional couplers, each directional coupler connected to a corresponding one of the second plurality of input lines.

18 Claims, 4 Drawing Sheets

MULTICHANNEL RECEIVER SYSTEM AND METHOD FOR MULTICHANNEL RECEIVER MONITORING

FIELD OF THE INVENTION

This invention in general relates to receivers and more specifically to a multichannel receiver system, a method for multichannel receiver monitoring, a radar system and a vehicle.

BACKGROUND OF THE INVENTION

Multichannel receiver systems are used in communication with antenna arrays to build phased arrays for example in radar systems, for enabling beam steering while avoiding mechanical moving parts of the radar system itself, which may be used for automotive applications.

Each receiving path of a multichannel receiver system may introduce a different absolute phase shift to the particular signal received on its receive antenna, which may be compensated by a calibration value determined either during a calibration phase, which may be repeated during dedicated timeslots or during regular receive operation without dedicated calibration phase.

SUMMARY OF THE INVENTION

The present invention provides a multichannel receiver system, a method for multichannel receiver monitoring, a radar system, a vehicle, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
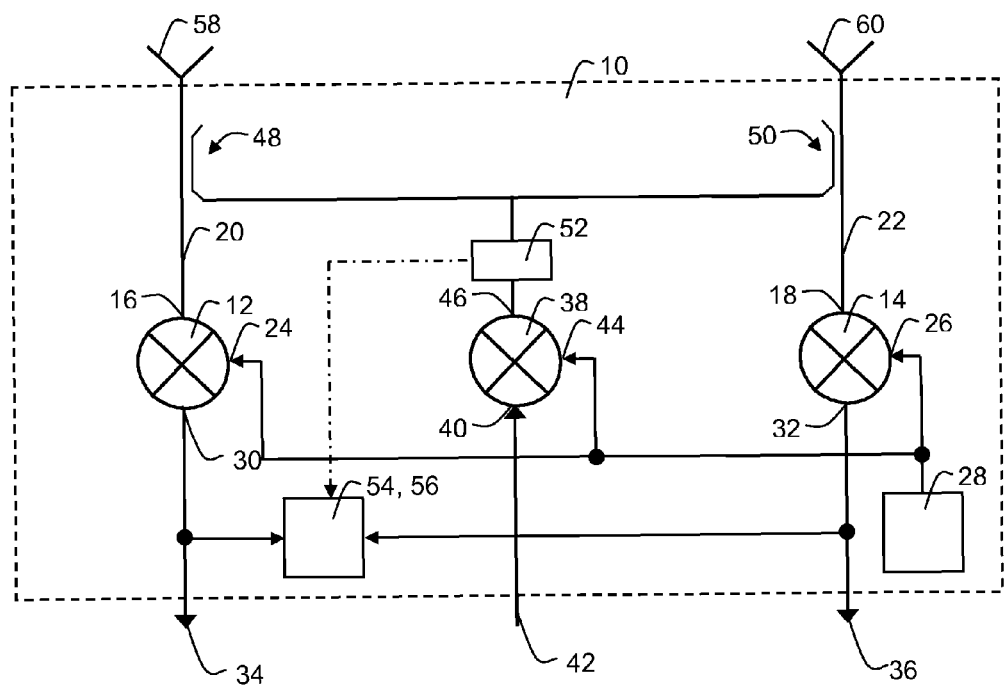
FIG. 1 shows a schematic block diagram of an example of an embodiment of a multichannel receiver system.

Referring to FIG. 1, a schematic block diagram of an example of an embodiment of a multichannel receiver system 10 is shown. The multichannel receiver system 10 comprises a first plurality of receiver circuits 12, 14. Each of these receiver circuits 12, 14 have a first input 16, 18 connected to a corresponding one of a second plurality of input lines 20, 22, each input line 20, 22 being arranged to provide a corresponding one of a third plurality of received signals. And the receiver circuits 12, 14 each comprise a second input 24, 26 connected to a local oscillator 28 arranged to provide a local oscillator signal, and an output 30, 32 arranged to provide a corresponding one of a fourth plurality of output signals 34, 36. The multichannel receiver system 10 also comprises an upconversion mixer 38 having a first mixer input 40 for receiving a reference signal 42, a second mixer input 44 connected to the local oscillator 28, and a mixer output 46 providing an upconverted reference signal to a fifth plurality of directional couplers 48, 50, each directional coupler 48, 50 being connected to a corresponding one of the second plurality of input lines 20, 22.

The input lines 20, 22 may carry the received signals. A signal may be a change of a physical quantity carrying information, for example an electromagnetic wave. A signal may for example be a radio frequency signal or an optical signal. Each of the second plurality of input lines 20, 22 may be connected to a corresponding receive antenna 58, 60 of a receive antenna array. However, input lines 20, 22 may be connected to wire lines instead of antennas.

The example system shown in FIG. 1 illustrating an embodiment of a multichannel receiver system may be a dual channel receiver system. It should be noted that the receiver system may comprise more than two receiving paths.

Received signals may be radio frequency signals or millimetre wave signals, for example modulated with a carrier signal. A receiver circuit 12, 14 may be a signal converter, for example a downconverter circuit or downconversion mixer, for example for de-modulating the received signal and providing an output signal 34, 36. An output signal may be an intermediate frequency signal or a baseband low-frequency signal. For conversion of the received array of signals, receiver circuits may also receive an identical local oscillator signal from a local oscillator circuit 28.

For example, the shown multichannel receiver system 10 may be used with radar signals. In order to reduce the need for mechanically moving parts of the radar system, beam steering may be applied to the antenna array. For the receiver system 10, the detection of the main lobe of the received radiation pattern may be achieved by evaluating the relative phases of the received signals, for example the received radio frequency signals. For example, for determination of an angle-of-arrival (AOA) of a received radar signal with a high angular resolution, the receiver system 10 connected to an antenna array 58, 60 may be used, wherein an angular position of a target is translated from the arrival time of the reflected signal at the antennas to relative phase differences in the output signals, which may be the downconverted baseband signals.

Relative phase differences between the received signals may be determined, although all receiving paths, i.e. receiver circuit 12, 14 and input line 20, 22 connected to an antenna 58, 60, may introduce phase shifts and changes of magnitude to the particular received signal. However, relative phase differences may be evaluated, if the introduced phase shifts of all receiving paths or channels are known. These phase shifts may vary, for example due to differences in the receiver hardware used arising for example from production variations, die assembly or aging over lifetime. Although the upconversion mixer may also introduce a phase shift, it may be identically fed into the receiving paths and therefore may not affect relative phase changes between received signals. This may also apply to possible amplitude changes caused by the coupled in reference signal.

For correct evaluation of phase differences, a deviation of phase shift for a particular channel may be determined, which may allow for calibration of the receiver system 10.

The upconversion mixer 38 may be a modulator circuit receiving a reference signal or test signal 42, which may be a low-frequency and very narrow bandwidth signal, and the same local oscillator 28 signal as the receiver circuits 12, 14. The upconversion mixer 38 may mix both signals for generating an upconverted reference signal in a frequency band close to the received signal frequency band. However, a different local oscillator signal may be used, if the upconverted reference signal has a frequency close to the frequency band of the received signal.

A frequency of the reference signal may be chosen such as not to interfere with the signals received e.g. via the antennas 58, 60 during regular operation.

Directional coupler 48, 50 connected to at least some of the input lines 20, 22 of the receiver system 10 may receive the upconverted reference signal and couple it into the received signal on the particular input line 20, 22. The coupled in upconverted reference signal may then be downconverted, together with the signal received at the antenna 58, 60 and may provide a reference within the output signal 34, 36 which may be used for calibration, since monitoring of the relative phase differences of the downconverted reference signals comprised in the output signals 34, 36 may allow for precisely determining phase shifts introduced. An energy of the reference signal may be chosen just large enough to allow for phase detection in the output signals, which may be the intermediate frequency signals.

For the described example, a directional coupler 48, 50 may be a high-frequency directional coupler (HFC), as well as a low-loss directional coupler, not or only weakly disturbing the regular receive operation of the receiver system. For example, a low-loss directional coupler may cause an insertion loss of 0.6 dB or less. Channel-to-channel isolation may not be degraded by coupling a reference signal into a received signal.

Signal mixing may generate an upper and a lower sideband spectrum of a signal. Coupling a double-sideband upconverted reference signal into a received signal may result in downconverted receiver output signals having an amplitude depending on the phase shift introduced by the receiving path. Therefore, the upconversion mixer 38 may be a single-sideband mixer, for example a Hartley modulator circuit. The single-sideband (SSB) upconversion mixer 38 may either generate an upconverted reference signal having the upper or the lower sideband.

For example, an output or intermediate frequency signal $x_{IF}(t)$ may be given by $x_{IF}(t)=\cos(\omega_{LO}t)\cos(\omega_{ref}t)\cos(\omega_{LO}t+\phi)$, wherein $\omega_{LO}$ is the local oscillator radial frequency, $\omega_{ref}$ is the reference signal frequency, t is time and $\phi$ is the phase shift introduced by the receiver circuit or downconversion mixer 12, 14. Without removal of for example the lower sideband, this signal may be given by $x_{IF}(t)=\{\cos([\omega_{LO}+\omega_{ref}]t)+\cos([\omega_{LO}-\omega_{ref}]t)\}*\cos(\omega_{LO}t+\phi)$. The SSB upconversion mixer 38 may remove one sideband, for example the lower sideband, giving $x_{IF}(t)=\cos([2\omega_{LO}+\omega_{ref}]t+\phi)+\cos(\omega_{ref}t-\phi)$. A low-pass filter may then remove higher frequency spectral components and the receiver circuit 12, 14 may provide an output signal $x_{IF}(t)=\cos(\omega_{ref}t-\phi)$, wherein the phase shift $\phi$ is preserved in the phase of the output signal, without modulating the output signal amplitude.

As shown, the upconversion mixer 38 may also be configured to suppress the local oscillator signal in the upconverted reference signal, i.e. the local oscillator signal may be used for modulating and frequency shifting the reference signal while avoiding or at least reducing self-mixing, without the local oscillator 28 signal itself becoming part of the upconverted reference signal, therefore reducing parasitic components in the output signal of the receiver circuit 12, 14 after downconversion and receiver circuit 12, 14 performance degradation. For the same reasons, the signal power of the upconverted reference signal at the first input 16, 18 of the receiver circuit 12, 14 may be at most 10 dB below the 1 dB compression point of the receiver circuit 12, 14.

Figure 2:
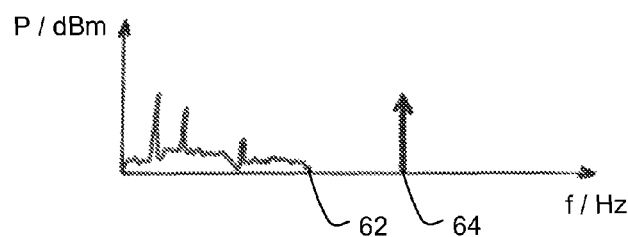
FIG. 2 shows a schematic diagram of an example of a power spectrum of a received signal comprising coupled in a reference signal.

Referring now also to FIG. 2, a schematic diagram of an example of a power spectrum of a received signal comprising coupled in a reference signal is shown. The diagram schematically shows a power ratio P measured in dBm, i.e. the power ratio in decibels (dB) of the measured power referenced to one milliwatt over frequency f (measured in Hertz) of the output intermediate frequency of a receiver circuit. The spectrum of the signal corresponding to the signal received on the antenna may have a maximum bandwidth 62. The upconversion mixer 38 may be configured to generate the upconverted reference signal having a frequency value outside of a frequency range of the third plurality of received signals. This may result in having the reference or test signal 64 in the power spectrum of the output signal close to but without interfering with the antenna signal spectrum.

The reference signal 42 applied to the upconversion mixer 38 may for example be generated externally. Or the multichannel receiver system 10 may comprise a frequency divider circuit (not shown) having a frequency divider input connected to the local oscillator 28 and a frequency divider output connected to the first mixer input 40. The frequency divider, which may for example be implemented as a frequency divider chain, may generate the low-frequency reference signal 42 from the local oscillator 28 signal.

And the multichannel receiver system 10 may be implemented as a monolithic integrated circuit, for example as a monolithic microwave integrated circuit (MMIC). Using one multichannel receiver die may allow to reduce phase shifts introduced by the receiving paths, since hardware variations between receiving paths due to production variation and signal interference due to coupling of separate circuits may be reduced.

A power of the reference signal may be below a compression point of the mixer 38, avoiding distortions introduced by the mixer. The 1 dB compression point of the mixer 38 may be the upper threshold of a dynamic range of the mixer, which may also be a signal amplifier. For example, the power of the reference signal may be at most 10 dB below the 1 dB compression point of the mixer 38.

Figure 3:
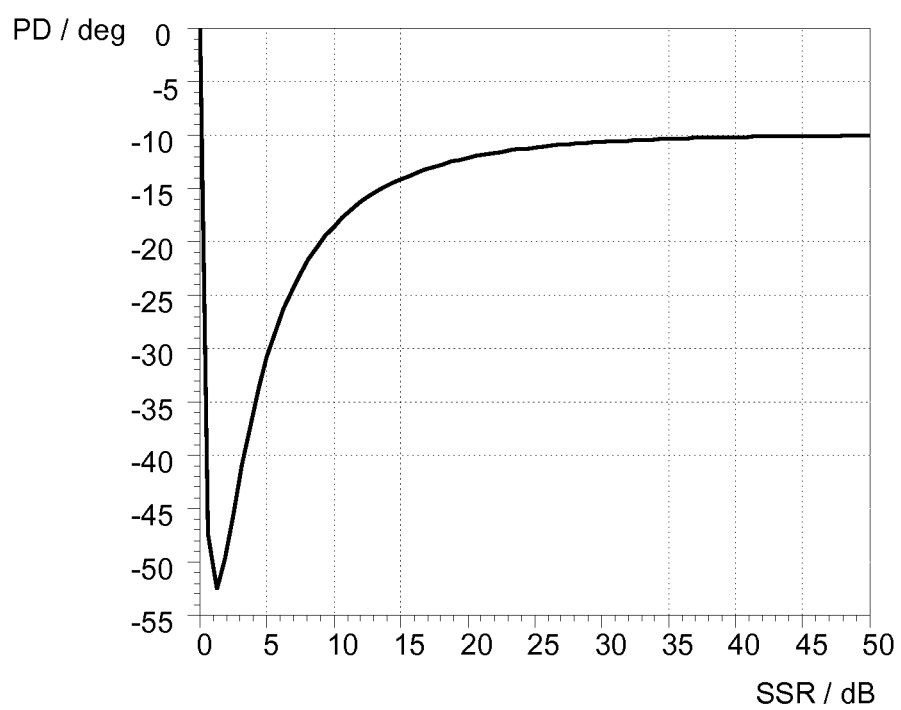
FIG. 3 shows a schematic diagram of an example of a phase difference versus sideband suppression ratio.

Referring now to FIG. 3, a schematic diagram of an example of a phase difference PD versus sideband suppression ratio SSR is shown. The shown diagram may apply to a dual channel receiver system as shown in FIG. 1, wherein for example both receive circuits 12, 14 may receive signals, each comprising the reference signal, but introduce phase shifts that differ by 10°. And the phase difference PD in degree between a first and a second intermediate frequency output signal 34, 36 delivered by the first and second receiver circuit 12, 14 is shown over a variable sideband suppression ratio SSR in decibel (dB) achieved by the upconversion mixer. It can be seen that the 10° phase shift may be recovered for a sideband suppression of 40 dB. The upconversion mixer may be configured to apply an IQ phase variation to the reference signal, i.e. a phase variation of the in-phase or the quadrature phase component of the reference signal which may further increase the sideband suppression ratio SSR.

Referring back to FIG. 1, the shown multichannel receiver system may comprise a peak detector circuit 52 connected to the mixer output 46. The peak detector circuit 52 may determine a maximum power of the upconverted reference signal. When comparing this reference power to the power of the reference signal as contained in the output signal 34, 36 of a receiver circuit 12, 14, a gain of the particular receiving path may be determined allowing for accurate comparison of gains of particular receiving paths and automatic gain calibration, i.e. relating the amplitude of the reference signal before coupling into a receiving path or channel and the amplitude of the reference signal comprised in the output signal of the receiving path may allow for eliminating or at least reducing changes in conversion gain.

Phase monitoring may be performed for example by a processor, e.g. outside of the multichannel receiver system 10, the processor receiving the output signals 34, 36. However, the multichannel receiver system 10 may comprise a phase monitoring module 54 connected to receive at least two of the fourth plurality of output signals 34, 36 and provide at least a difference phase value. The phase monitoring module 54 may determine a phase of an output signal 34, 36 comprising a phase shift introduced by the receiving path. However, a relative phase shift of the reference signal and therefore of the received signal may be determined and be used for calibration of the particular receiving path. This calibration may, as well as the monitoring process be performed in-situ during regular operation without switching the system 10 or the receiving path in a calibration mode, which may for example interrupt or at least disturb receive operation of the system 10. Due to phase calibration of the system 10, the system 10 may be able to introduce the same or at least very similar phase shift to the received signals, therefore allowing for high-resolution determination of relative phase differences or phase variations between signals received on different signal paths, which may for example allow for an accurate determination of the angle-of-arrival of the main lobe of the signal being received.

And the multichannel receiver system 10 may comprise a gain monitoring module 56 connected to receive a value corresponding to a power of the upconverted reference signal and to receive at least one of the fourth plurality of output signals 34, 36 and provide a gain value for the at least one of the fourth plurality of output signals 34, 36. The gain monitoring module 56 may be configured to determine a gain between the upconverted reference signal and the reference signal part comprised in the receiver output signals 34, 36, therefore allowing to detect and compensate gain variations of a receiving path and between receiving paths. As shown in FIG. 1, the system 10 may comprise a phase monitoring module 54 and a gain monitoring module 56 combined in a phase and gain monitoring module or circuit 54, 56.

Figure 4:
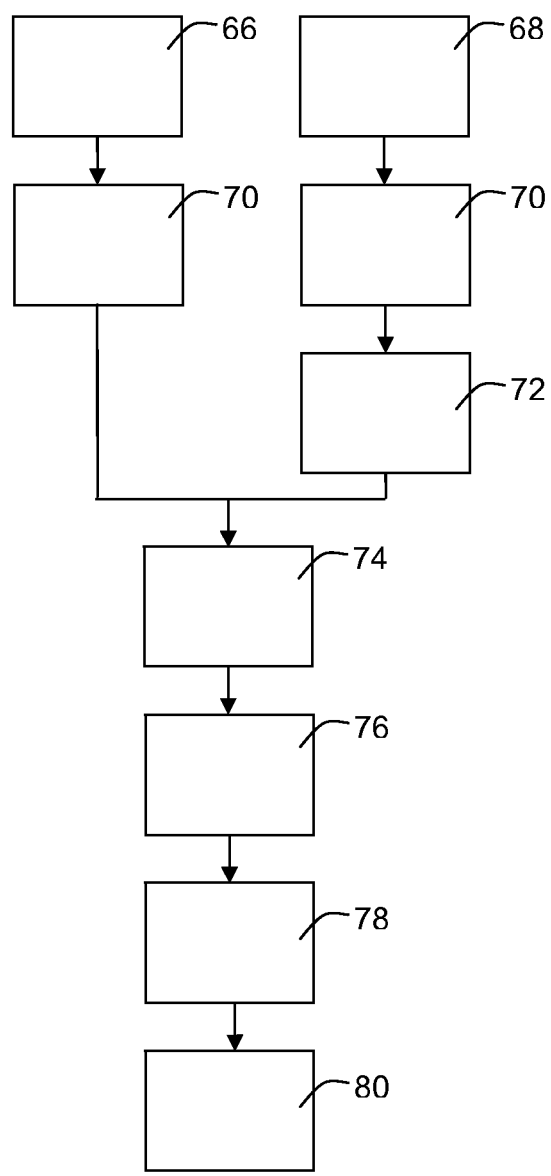
FIG. 4 shows a schematic flow diagram of an example of an embodiment of a method for multichannel receiver monitoring.

Referring now to FIG. 4, a schematic flow diagram of an example of an embodiment of a method for multichannel receiver monitoring is shown. The method for multichannel receiver monitoring may comprise receiving 66 each of a first plurality of received signals on a corresponding first input of a corresponding one of a second plurality of receiver circuits connected to a corresponding one of a third plurality of input lines; receiving 68 a reference signal on a first mixer input of an upconversion mixer; receiving 70 a local oscillator signal on a corresponding second input of a corresponding one of the second plurality of receiver circuits and on a second input of the upconversion mixer; providing 72 an upconverted reference signal on an output of the upconversion mixer; coupling 74 the upconverted reference signal into the first plurality of received signals using a fourth plurality of directional couplers; providing 76 each of a fifth plurality of downconverted output signals on a corresponding output of a corresponding one of the second plurality of receiver circuits; generating 78 a difference phase value for at least two of the downconverted output signals comprising the downconverted reference signal; and determining 80 a phase variation between the difference phase values.

The described method may allow implementing the advantages and characteristics of the described multichannel receiver system as part of a method for multichannel receiver monitoring.

The method for multichannel receiver monitoring may be a method for phase and gain monitoring and may comprise receiving a value corresponding to a power of the upconverted reference signal; receiving at least one of the fifth plurality of output signals and generating a gain value for the at least one of the fifth plurality of output signals.

Figure 5:
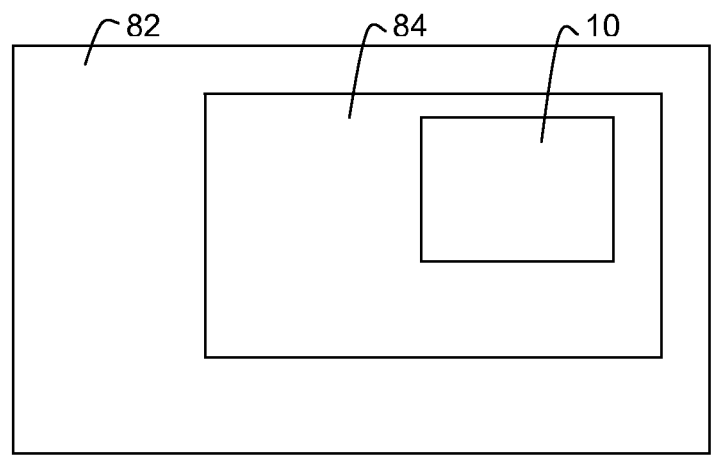
FIG. 5 schematically shows an example of an embodiment of a vehicle comprising a radar system having a multichannel receiver system.

Referring now also to FIG. 5, an example of an embodiment of a vehicle 82 comprising a radar system 84 having a multichannel receiver system 10 is shown. As shown, a radar system 84 may comprise a multichannel receiver system 10 or may execute steps of a method as described above. The radar system 84 may be implemented based on for example a 77 GHz radar chipset. The radar system 84 may be an automotive radar system. Radar technology may for example be used for road safety applications such as Adaptive Cruise Control (ACC) 'long-range radar', which may for example operate at 77 GHz. This may enable a vehicle to maintain a cruising distance from a vehicle in front. As another example, radar may also be used for anti-collision 'short-range radar' operating for example in a range of 24 GHz, 26 GHz or 79 GHz. Here it may be part of a system for warning a driver of a pending collision, enabling avoiding action to be taken. In the event where collision is inevitable, the vehicle may prepare itself, for example by applying brakes, pre-tensioning seat belts etc., for reducing injury to passengers and others. It should be noted that the presented system may be applied to applications using any other frequency range, for example other mm-wave applications, e.g. working at 122 GHz or using a wireless personal area network (WPAN) communication applications, for example working at 60 GHz and employing IEEE 802.15 standard, car2car ad-hoc networks, just to name a few.

The vehicle 82 may comprise a radar system 84 or a multichannel receiver system 10 as described above. A vehicle 82 may be a car. However, it may be any automotive apparatus, such as a plane, a ship, a helicopter etc.

Further, a computer program product may comprise code portions for executing steps of a method or for implementing parts of a multichannel receiver system as described above when run on a programmable apparatus. The invention may for example at least partly be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatuses implementing the present invention are, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different systems. For example, although FIG. 1 and the discussion thereof describe an exemplary system, this exemplary system is presented merely to provide a useful reference in discussing various aspects of the invention. Of course, the description has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or impose an alternate decomposition of functionality upon various logic blocks.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor application specific integrated circuit (ASIC), field programmable gate array (FPGA), programmable logic array (PLA), a device implementing a state machine, a microcontroller unit (MCU).

Furthermore, the devices may be physically distributed over a number of apparatuses, while functionally operating as a single device. For example, in one embodiment, the multichannel receiver system 10 may comprise a local oscillator module. In another embodiment, the local oscillator signal may be received from an oscillator being connected to the receiver system 10. As another example, the monitoring module 54, 56 may be a part of system 10 or may at least partly be comprised in a programmable apparatus for example being a computer system. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. Also for example, system 10 or portions thereof may be soft or code representations of physical circuitry or of logical representations convertible into physical circuitry. As such, system 10 may be embodied in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim 1ncludes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A multichannel receiver system, comprising:
   a first plurality of receiver circuits, each receiver circuit comprising
      a first input connected to a corresponding one of a second plurality of input lines, each input line arranged to provide a corresponding one of a third plurality of received signals,
      a second input connected to a local oscillator arranged to provide a local oscillator signal, and
      an output arranged to provide a corresponding one of a fourth plurality of output signals; and
   an upconversion mixer comprising
      a first mixer input for receiving a reference signal,
      a second mixer input connected to said local oscillator, and a mixer output providing an upconverted reference signal to a fifth plurality of directional couplers, each directional coupler connected to said corresponding one of said second plurality of input lines.

2. The multichannel receiver system as claimed in claim 1, wherein said upconversion mixer is a single-sideband mixer.

3. The multichannel receiver system as claimed in claim 1, wherein said upconversion mixer is configured to suppress said local oscillator signal in said upconverted reference signal.

4. The multichannel receiver system as claimed in claim 1, wherein said upconversion mixer is configured to generate said upconverted reference signal having a frequency value outside of a frequency range of said third plurality of received signals.

5. The multichannel receiver system as claimed in claim 1, comprising a frequency divider circuit having a frequency divider input connected to said local oscillator and a frequency divider output connected to said first mixer input.

6. The multichannel receiver system as claimed in claim 1, wherein a power of said reference signal is below a compression point of said mixer.

7. The multichannel receiver system as claimed in claim 1, wherein said multichannel receiver system is implemented as a monolithic integrated circuit.

8. The multichannel receiver system as claimed in claim 1, comprising a peak detector circuit connected to said mixer output.

9. The multichannel receiver system as claimed in claim 1, comprising a phase monitoring module connected to receive at least two of said fourth plurality of output signals and provide at least a difference phase value.

10. The multichannel receiver system as claimed in claim 1, comprising a gain monitoring module connected to receive a value corresponding to a power of said upconverted reference signal and to receive at least one of said fourth plurality of output signals and provide a gain value for said at least one of said fourth plurality of output signals.

11. A method for multichannel receiver monitoring, comprising:
  receiving each of a first plurality of received signals on a corresponding first input of a corresponding one of a second plurality of receiver circuits connected to a corresponding one of a third plurality of input lines;
  receiving a reference signal on a first mixer input of an upconversion mixer;
  receiving a local oscillator signal on a corresponding second input of said corresponding one of said second plurality of receiver circuits and on a second input of said upconversion mixer;
  providing an upconverted reference signal on an output of said upconversion mixer;
  coupling said upconverted reference signal into said first plurality of received signals using a fourth plurality of directional couplers;
  providing each of a fifth plurality of downconverted output signals on a corresponding output of said corresponding one of said second plurality of receiver circuits;
  generating difference phase values for at least two of said fifth plurality of downconverted output signals comprising a downconverted reference signal; and
  determining a phase variation between said difference phase values.

12. The method as claimed in claim 11, comprising
  receiving a value corresponding to a power of said upconverted reference signal;
  receiving at least one of said fifth plurality of downconverted output signals; and
  generating a gain value for said at least one of said fifth plurality of downconverted output signals.

13. The method as claimed in claim 11, wherein said upconversion mixer is a single-sideband mixer.

14. The method as claimed in claim 11, wherein said upconversion mixer is further configured to perform steps comprising suppressing said local oscillator signal in said upconverted reference signal.

15. The method as claimed in claim 11, wherein said upconversion mixer is further configured to perform steps comprising generating said upconverted reference signal having a frequency value outside of a frequency range of said first plurality of received signals.

16. The method as claimed in claim 11, wherein a power of said reference signal is below a compression point of said mixer.

17. A radar system, comprising a multichannel receiver system, wherein the multichannel receiver system comprises:
  a first plurality of receiver circuits, wherein each receiver circuit comprises
    a first input connected to a corresponding one of a second plurality of input lines, each input line arranged to provide a corresponding one of a third plurality of received signals,
    a second input connected to a local oscillator arranged to provide a local oscillator signal, and
    an output arranged to provide a corresponding one of a fourth plurality of output signals; and
  an upconversion mixer having
    a first mixer input for receiving a reference signal;
    a second mixer input connected to said local oscillator; and
    a mixer output providing an upconverted reference signal to a fifth plurality of directional couplers, each directional coupler connected to said corresponding one of said second plurality of input lines.

18. A vehicle, comprising the radar system as claimed in claim 17.

* * * * *